US012557037B2

(12) United States Patent
Saad et al.

(10) Patent No.: US 12,557,037 B2
(45) Date of Patent: Feb. 17, 2026

(54) FILTER POWER DISTRIBUTION INDICATION

(71) Applicant: NOKIA TECHNOLOGIES OY, Espoo (FI)

(72) Inventors: Majed Saad, Massy (FR); Esa Tapani Tiirola, Oulu (FI); Nhat-Quang Nhan, Reims (FR); Oskari Tervo, Oulu (FI); Marco Maso, Issy les Moulineaux (FR); Arto Lehti, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 378 days.

(21) Appl. No.: 18/111,358

(22) Filed: Feb. 17, 2023

(65) Prior Publication Data

US 2024/0284347 A1   Aug. 22, 2024

(51) Int. Cl.
*H04W 52/34* (2009.01)
*H04W 52/36* (2009.01)

(52) U.S. Cl.
CPC ......... *H04W 52/34* (2013.01); *H04W 52/365* (2013.01); *H04W 52/367* (2013.01)

(58) Field of Classification Search
CPC . H04W 52/34; H04W 52/365; H04W 52/367; H04W 52/346
See application file for complete search history.

(56) References Cited

U.S. PATENT DOCUMENTS

| | | | | |
|---|---|---|---|---|
| 2011/0136484 | A1* | 6/2011 | Braun | H04W 52/46 455/422.1 |
| 2020/0288412 | A1* | 9/2020 | Ajdakple | H04W 52/365 |

OTHER PUBLICATIONS

Huawei et al: "Discussion on coverage enhancement in power domain", 3GPP Draft; R1-2208412, 3rd Gemeration Partnership Project (3GPP), France, vol. RAN WG1, No. e-Meeting; Oct. 10, 2022 Sep. 30, 2022 (Sep. 30, 2022), XP052276337. (Year: 2022).*
European Office Action issued in corresponding European Patent Application No. 24155163.9-1206 on Jul. 4, 2024.
Huawei, HiSilicon, "Discussion on coverage enhancement in power domain", 3GPP TSG-RAN WG1 Meeting #110bis- e, e-Meeting, Oct. 10-19, 2022, R1-2208412, 30 pages.
Nokia, Nokia Shanghai Bell, "RAN1 impacts for power domain enhancements", 3GPP TSG RAN WG1 #111, Toulouse, France, Nov. 14-18, 2022, R1-2211596, 39 pages.

(Continued)

*Primary Examiner* — John J Lee
(74) *Attorney, Agent, or Firm* — SQUIRE PATTON BOGGS (US) LLP

(57) ABSTRACT

Systems, methods, apparatuses, and computer program products for filter power distribution indication. A method may include determining a first size of a first part of a frequency band segment within a total bandwidth allocation, and a second size of a second part of the frequency band segment. The method may also include determining a value indicative of a power spectral density difference or power difference between the first part and the second part. The method may further include generating a power indication of the frequency band segment within the total bandwidth allocation based on the power spectral density difference. In addition, the method may include signaling, to a network element, the power indication for the frequency band segment within the total bandwidth allocation.

18 Claims, 15 Drawing Sheets

(56) References Cited

OTHER PUBLICATIONS

Ismael Peruga NASARRE et al, "Enhanced Uplink Coverage for 5G NR: Frequency-Domain Spectral Shaping with Spectral Extension", IEEE ComSoc, IEEE Open Journal of the Communications Society, vol. 2, 2021, DOI: 10.1109/OJCOMS.2021.3082688, 17 pages.
3GPP TS 38.321 V18.2.0 (Jun. 2024), Technical Specification, 3rd Generation Partnership Project; Technical Specification Group Radio Access Network; NR; Medium Access Control (MAC) protocol specification (Release 18), 332 pages.
Nokia, Nokia shanghai Bell, "Discussion on Approaches and Solutions for NR PUSCH Coverage Enhancement", 3GPP TSG RAN WG1 #103, 3-Meeting, Oct. 26-Nov. 13, 2020, R1-2008703, 15 pages.
Huawei, HiSilicon, "Performance Evaluation for pi/2 BPSK with FDSS", 3GPP TSG RAN WG1 Meeting #88bis, Spokane, USA, Apr. 3-7, 2017, R1-1705060, 8 pages.
Nokia, Alcatel-Lucent Shanghai Bell, "On Spectrum Shaping for Uplink Pi/2 BPSK with DFT-S-OFDM", 3GPP TSG-RAN WG1#89, Hangzhou, P.R. China, May 15-19, 2017, R1-1709002, 3 pages.
Iith, "Further Link Results for p/2 BPSK DFT-S-OFDM Waveform with Spectrum", 3GPP TSG RAN Wg4 Meeting #85, Reno, USA Nov. 27-Dec. 1, 2017, R4-1714191, 5 pages.
NTT DoCoMo, NEC, Sharp, "DFT-Spread OFDM with Pulse Shaping Filter in Frequency Domain in Evolved UTRA Uplink", 3GPP TSG RAN WG1 #42 on LTE, London, UK, Aug. 29-Sep. 2, 2005, R1-050702, 8 pages.

\* cited by examiner

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

FIG. 4

X dBm values represent UE minimum power requirements for PC3 (power class 3)

PC3: 23 dBm
Min requirement

Maximum power reduction (MPR) for power class 3

| Modulation | | Edge RB allocations | MPR (dB) Outer RB allocations | | Inner RB allocations | |
|---|---|---|---|---|---|---|
| | Pi/2 BPSK | ≤3.5[1] 22.5 dBm | ≤1.2[1] 24.8 dBm | | 25.8 dBm | ≤0.2[1] |
| | | ≤0.5[2] 22.5 dBm | ≤0.5[2] 22.5 dBm | | 23 dBm | 0[2] |
| DFT-s-OFDM | QPSK | 22 dBm | ≤1 | | 23 dBm | 0 |
| | 16 QAM | 21 dBm | ≤2 | | 22 dBm | ≤1 |
| | 64 QAM | 20.5 dBm | | ≤2.5 | | |
| | 256 QAM | 18.5 dBm | | ≤4.5 | | |
| CP-OFDM | QPSK | 20 dBm | ≤3 | | 21.5 dBm | ≤1.5 |
| | 16 QAM | 20 dBm | ≤3 | | 21 dBm | ≤2 |
| | 64 QAM | 19.5 dBm | | ≤3.5 | | |
| | 256 QAM | 16.5 dBm | | ≤6.5 | | |

NOTE 1: Applicable for UE operating in TDD mode with Pi/2 BPSK modulation and UE indicates support for UE capability *powerBoosting-pi2BPSK* and if the IE *powerBoostPi2BPSK* is set to 1 and 40 % or less slots in radio frame are used for UL transmission for bands n40, n41, n77, n78 and n79. The reference power of 0 dB MPR is 26 dBm.

NOTE 2: Applicable for UE operating in FDD mode, or in TDD mode in bands other than n40, n41, n77, n78 and n79 with Pi/2 BPSK modulation and if the IE *powerBoostPi2BPSK* is set to 0 and if more than 40 % of slots in radio frame are used for UL transmission for bands n40, n41, n77, n78 and n79.

FIG. 5

FILTER POWER DISTRIBUTION INDICATION

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for filter power distribution indication.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, fifth generation (5G) radio access technology or NR access technology, and/or 5G-Advanced. 5G wireless systems refer to the next generation (NG) of radio systems and network architecture. 5G network technology is mostly based on NR technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include determining a first size of a first part of a frequency band segment within a total bandwidth allocation, and a second size of a second part of the frequency band segment. The method may also include determining a value indicative of a power spectral density difference or power difference between the first part and the second part. The method may further include generating a power indication of the frequency band segment within the total bandwidth allocation based on the power spectral density difference. In addition, the method may include signaling, to a network element, the power indication for the frequency band segment within the total bandwidth allocation.

Other example embodiments may be directed to an apparatus. The apparatus may include at least one processor and at least one memory including computer program code. The at least one memory and computer program code may be configured to, with the at least one processor, cause the apparatus at least to determine a first size of a first part of a frequency band segment within a total bandwidth allocation, and a second size of a second part of the frequency band segment. The apparatus may also be caused to determine a value indicative of a power spectral density difference or power difference between the first part and the second part. The apparatus may further be caused to generate a power indication of the frequency band segment within the total bandwidth allocation based on the power spectral density difference. In addition, the apparatus may be caused to signal, to a network element, the power indication for the frequency band segment within the total bandwidth allocation.

Other example embodiments may be directed to an apparatus. The apparatus may include means for determining a first size of a first part of a frequency band segment within a total bandwidth allocation, and a second size of a second part of the frequency band segment. The apparatus may also include means for determining a value indicative of a power spectral density difference or power difference between the first part and the second part. The apparatus may further include means for generating a power indication of the frequency band segment within the total bandwidth allocation based on the power spectral density difference. In addition, the apparatus may include means for signaling, to a network element, the power indication for the frequency band segment within the total bandwidth allocation.

In accordance with other example embodiments, a non-transitory computer readable medium may be encoded with instructions that may, when executed in hardware, perform a method. The method may include determining a first size of a first part of a frequency band segment within a total bandwidth allocation, and a second size of a second part of the frequency band segment. The method may also include determining a value indicative of a power spectral density difference or power difference between the first part and the second part. The method may further include generating a power indication of the frequency band segment within the total bandwidth allocation based on the power spectral density difference. In addition, the method may include signaling, to a network element, the power indication for the frequency band segment within the total bandwidth allocation.

Other example embodiments may be directed to a computer program product that performs a method. The method may include determining a first size of a first part of a frequency band segment within a total bandwidth allocation, and a second size of a second part of the frequency band segment. The method may also include determining a value indicative of a power spectral density difference or power difference between the first part and the second part. The method may further include generating a power indication of the frequency band segment within the total bandwidth allocation based on the power spectral density difference. In addition, the method may include signaling, to a network element, the power indication for the frequency band segment within the total bandwidth allocation.

Other example embodiments may be directed to an apparatus that may include circuitry configured to determine a first size of a first part of a frequency band segment within a total bandwidth allocation, and a second size of a second part of the frequency band segment. The apparatus may also include circuitry configured to determine a value indicative of a power spectral density difference or power difference between the first part and the second part. The apparatus may further include circuitry configured to generate a power indication of the frequency band segment within the total bandwidth allocation based on the power spectral density difference. In addition, the apparatus may include circuitry configured to signal, to a network element, the power indication for the frequency band segment within the total bandwidth allocation.

Certain example embodiments may be directed to a method. The method may include determining at least one value based on a bandwidth indication corresponding to a power containment ratio. According to certain example embodiments, the determination may be performed by using a transmitter filter with a frequency domain spectrum shaping waveform. The method may also include signaling the at least one value to a network element.

Other example embodiments may be directed to an apparatus. The apparatus may include at least one processor and at least one memory including computer program code. The at least one memory and computer program code may be configured to, with the at least one processor, cause the apparatus at least to determine at least one value based on a bandwidth indication corresponding to a power containment ratio. According to certain example embodiments, the determination may be performed by using a transmitter filter with a frequency domain spectrum shaping waveform. The apparatus may also be caused to signal the at least one value to a network element.

Other example embodiments may be directed to an apparatus. The apparatus may include means for determining at least one value based on a bandwidth indication corresponding to a power containment ratio. According to certain example embodiments, the determination may be performed by using a transmitter filter with a frequency domain spectrum shaping waveform. The apparatus may also include means for signaling the at least one value to a network element.

In accordance with other example embodiments, a non-transitory computer readable medium may be encoded with instructions that may, when executed in hardware, perform a method. The method may include determining at least one value based on a bandwidth indication corresponding to a power containment ratio. According to certain example embodiments, the determination may be performed by using a transmitter filter with a frequency domain spectrum shaping waveform. The method may also include signaling the at least one value to a network element.

Other example embodiments may be directed to a computer program product that performs a method. The method may include determining at least one value based on a bandwidth indication corresponding to a power containment ratio. According to certain example embodiments, the determination may be performed by using a transmitter filter with a frequency domain spectrum shaping waveform. The method may also include signaling the at least one value to a network element.

Other example embodiments may be directed to an apparatus that may include circuitry configured to determine at least one value based on a bandwidth indication corresponding to a power containment ratio. According to certain example embodiments, the determination may be performed by using a transmitter filter with a frequency domain spectrum shaping waveform. The apparatus may also include circuitry configured to signal the at least one value to a network element.

Some example embodiments may be directed to a method. The method may include indicating to a user equipment implicitly or explicitly a first size of a first part of a frequency band segment within a total bandwidth allocation, and a second size of a second part of the frequency band segment. The method may also include determining at least one threshold value for a power spectral density or a power difference between the first part of the frequency band segment and the second part of the frequency band segment. The method may further include signaling, to the user equipment, a configuration for the at least one threshold value to use in an indication of a frequency domain spectrum shaping filter power distribution. In addition, the method may include receiving, from the user equipment, a power indication for the frequency domain spectrum shaping filter power distribution.

Other example embodiments may be directed to an apparatus. The apparatus may include at least one processor and at least one memory including computer program code. The at least one memory and computer program code may be configured to, with the at least one processor, cause the apparatus at least to indicate to a user equipment implicitly or explicitly a first size of a first part of a frequency band segment within a total bandwidth allocation, and a second size of a second part of the frequency band segment. The apparatus may also be caused to determine at least one threshold value for a power spectral density or a power difference between the first part of the frequency band segment and the second part of the frequency band segment. The apparatus may further be caused to signal, to the user equipment, a configuration for the at least one threshold value to use in an indication of a frequency domain spectrum shaping filter power distribution. In addition, the apparatus may be caused to receive, from the user equipment, a power indication for the frequency domain spectrum shaping filter power distribution.

Other example embodiments may be directed to an apparatus. The apparatus may include means for indicating to a user equipment implicitly or explicitly a first size of a first part of a frequency band segment within a total bandwidth allocation, and a second size of a second part of the frequency band segment. The apparatus may also include means for determining at least one threshold value for a power spectral density or a power difference between the first part of the frequency band segment and the second part of the frequency band segment. The apparatus may further include means for signaling, to the user equipment, a configuration for the at least one threshold value to use in an indication of a frequency domain spectrum shaping filter power distribution. In addition, the apparatus may include means for receiving, from the user equipment, a power indication for the frequency domain spectrum shaping filter power distribution.

In accordance with other example embodiments, a non-transitory computer readable medium may be encoded with instructions that may, when executed in hardware, perform a method. The method may include indicating to a user equipment implicitly or explicitly a first size of a first part of a frequency band segment within a total bandwidth allocation, and a second size of a second part of the frequency band segment. The method may also include determining at least one threshold value for a power spectral density or a power difference between the first part of the frequency band segment and the second part of the frequency band segment. The method may further include signaling, to the user equipment, a configuration for the at least one threshold value to use in an indication of a frequency domain spectrum shaping filter power distribution. In addition, the method may include receiving, from the user equipment, a power indication for the frequency domain spectrum shaping filter power distribution.

Other example embodiments may be directed to a computer program product that performs a method. The method may include indicating to a user equipment implicitly or explicitly a first size of a first part of a frequency band segment within a total bandwidth allocation, and a second size of a second part of the frequency band segment. The method may also include determining at least one threshold value for a power spectral density or a power difference between the first part of the frequency band segment and the second part of the frequency band segment. The method may further include signaling, to the user equipment, a configuration for the at least one threshold value to use in an indication of a frequency domain spectrum shaping filter power distribution. In addition, the method may include receiving, from the user equipment, a power indication for the frequency domain spectrum shaping filter power distribution.

Other example embodiments may be directed to an apparatus that may include circuitry configured to indicate to a user equipment implicitly or explicitly a first size of a first part of a frequency band segment within a total bandwidth allocation, and a second size of a second part of the frequency band segment. The apparatus may also include circuitry configured to determine at least one threshold value for a power spectral density or a power difference between the first part of the frequency band segment and the second part of the frequency band segment. The apparatus may further include circuitry configured to signal, to the user equipment, a configuration for the at least one threshold value to use in an indication of a frequency domain spectrum shaping filter power distribution. In addition, the apparatus may include circuitry configured to receive, from the user equipment, a power indication for the frequency domain spectrum shaping filter power distribution.

BRIEF DESCRIPTION OF THE DRAWINGS

For proper understanding of example embodiments, reference should be made to the accompanying drawings, wherein:

FIG. 4 illustrates an example power headroom report (PHR).

FIG. 5 illustrates an example maximum power reduction (MPR) for user equipment (UE) power class 3.

DETAILED DESCRIPTION

Figure 1:
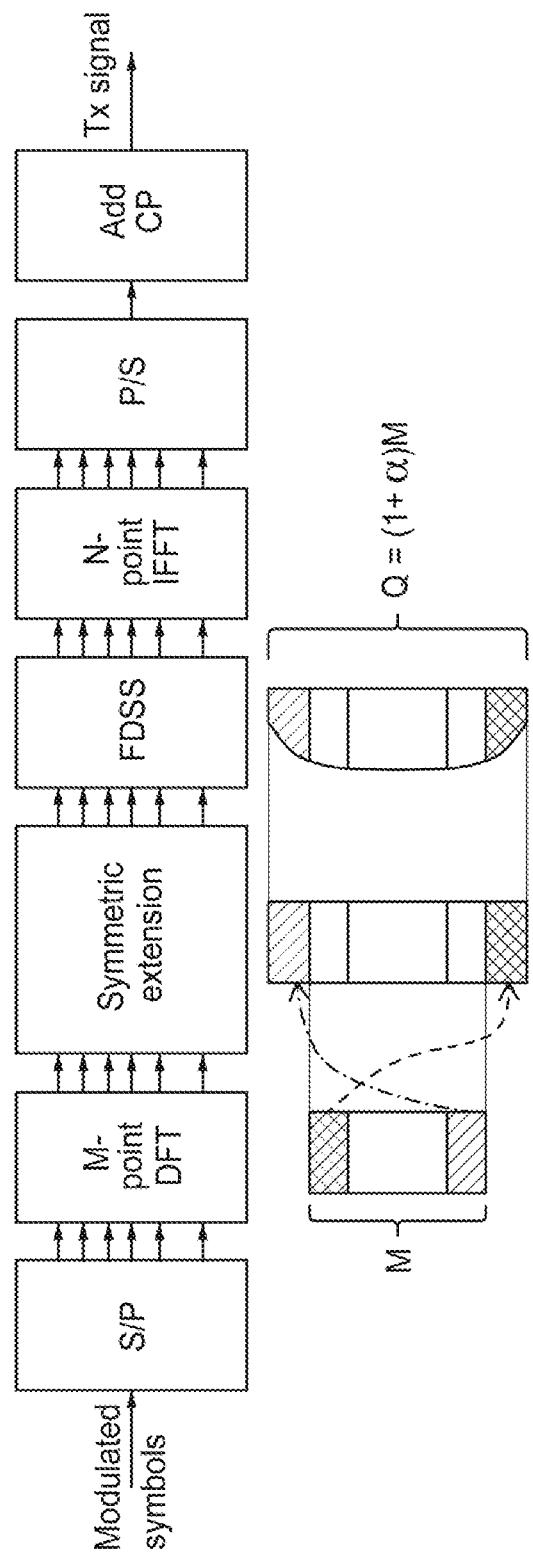
FIG. 1 illustrates an example block-diagram of DFT-s-OFDM transmitter with frequency domain spectrum sharing (FDSS) and spectral extension.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for filter power distribution indication. For example, certain example embodiments may be directed to filter power distribution with frequency domain spectrum shaping (FDSS). As described herein certain example embodiments may provide enhancements that enable higher user equipment (UE) transmit powers by reducing a signal's peak-to-average power ratio (PAPR). Additionally, certain example embodiments may take into consideration spectrum extension for FDSS, and provide means to improve a gNB's ability to control FDSS with SE.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

The technical specifications of the Third Generation Partnership Project (3GPP) describe 5G NR waveforms where modulated symbols and/or reference signals (RSs) may be converted to a waveform, which is a baseband signal before it is mixed to radio frequency (RF) and transmitted over the air-interface. 5G NR describes waveforms including, but not limited to, cyclic prefix orthogonal frequency division multiplexing (CP-OFDM), which may be applicable to both uplink (UL) and downlink (DL). Another example waveform may include discrete Fourier transform spread orthogonal frequency division multiplexing (DFT-s-OFDM), which may be applicable to only UL. In the future, various following waveforms described herein may be applied in both UL and DL. Such waveforms may include, but not limited to, for example, DFT-s-OFDM, DFT-s-OFDM FDSS without SE, and DFT-s-OFDM FDSS with SE.

DFT-s-OFDM may support a single transmission layer (e.g., rank=1) per user, whereas CP-OFDM may support more than one layer (e.g., rank≥1). This means that CP-OFDM may offer a higher throughput and capacity than DFT-s-OFDM. In contrast, DFT-s-OFDM may have a lower PAPR than its counterpart, which allows DFT-s-OFDM to be used with a higher transmit power and, thus, offering better coverage. Furthermore, DFT-s-OFDM may be generated by adding a transform precoding block before the processing blocks used for generating CP-OFDM. The transform precoding block may be a fast Fourier transform (FFT) block (e.g., DFT block in FIG. 1) that converts a time domain signal into a frequency domain signal.

FDSS may be paired with or without SE. Although DFT-s-OFDM may offer a lower PAPR compared to CP-OFDM, 5G NR also introduced an FDSS function that may be used to further reduce the PAPR and/or lower cubic metric (CM). This entails further lowering of the maximum power reduction (MPR) and, thus, achieve higher maximum transmission power for coverage enhancement.

$$P_{PUSCH,b,f,c}(i, j, q_d, l) = \min \begin{Bmatrix} P_{CMAX,f,c}(i), \\ P_{O_{PUSCH,b,f,c}}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{Bmatrix} [dBM],$$ (1)

Spectral shaping and SE are two independent techniques. As such, the shaping may be applied with or without SE. FIG. 1 illustrates an example block-diagram of DFT-s-OFDM transmitter with FDSS and spectral extension. As illustrated in FIG. 1, the NR UL transmitter has both frequency domain spectral shaping and SE applied. In spectral shaping, the transition band bins may be weighted by the FDSS function before mapping to the inverse fast Fourier transform (IFFT) input. The FDSS with SE may have an additional cyclic extension block which results in excess-bands.

The block diagram in FIG. 1 includes an in-band size occupied by resource elements (REs) after the DFT-block (i.e., M in FIG. 1). An SE definition is also illustrated in FIG. 1. For example, FIG. 1 includes an excess-band size corresponding to the amount of REs for SE (i.e., (Q–M) in FIG. 1). The total allocation size may be defined by the in-band size+excess-band size. Further, the total allocation size may include occupied REs after "symmetric extension block" (i.e., Q in FIG. 1). The amount of extension may be expressed by means of an extension factor α=(Q–M)/Q (i.e., excess-band size/total allocation size).

The SE may provide several advantages. For instance, the SE may reduce the PAPR since the effective pulses have a larger time separation. The SE may also reduce the inter-symbol interference caused by the introduction of the FDSS. A further advantage is that since the excess-band carries data, it may or may not be used by the gNB receiver. In case the excess-band is used by the gNB receiver, it may provide further frequency diversity. The shaping function without spectrum entails the existence of a tradeoff between demodulation performance and the Tx power gain, while shaping with SE entails a tradeoff between spectral efficiency and Tx power gain.

In Rel-15, the FDSS without SE for DFT-s-OFDM may be used with pi/2-binary phase shift keying (BPSK) modulation. Given that it may be desirable for Rel-18 to improve the UL coverage, enhancements for other higher order modulation techniques may also be taken into account. FDSS with symmetric SE may be one candidate solution to achieve this objective, and may be an important enabler for coverage improvement in Rel-18.

Figure 2:
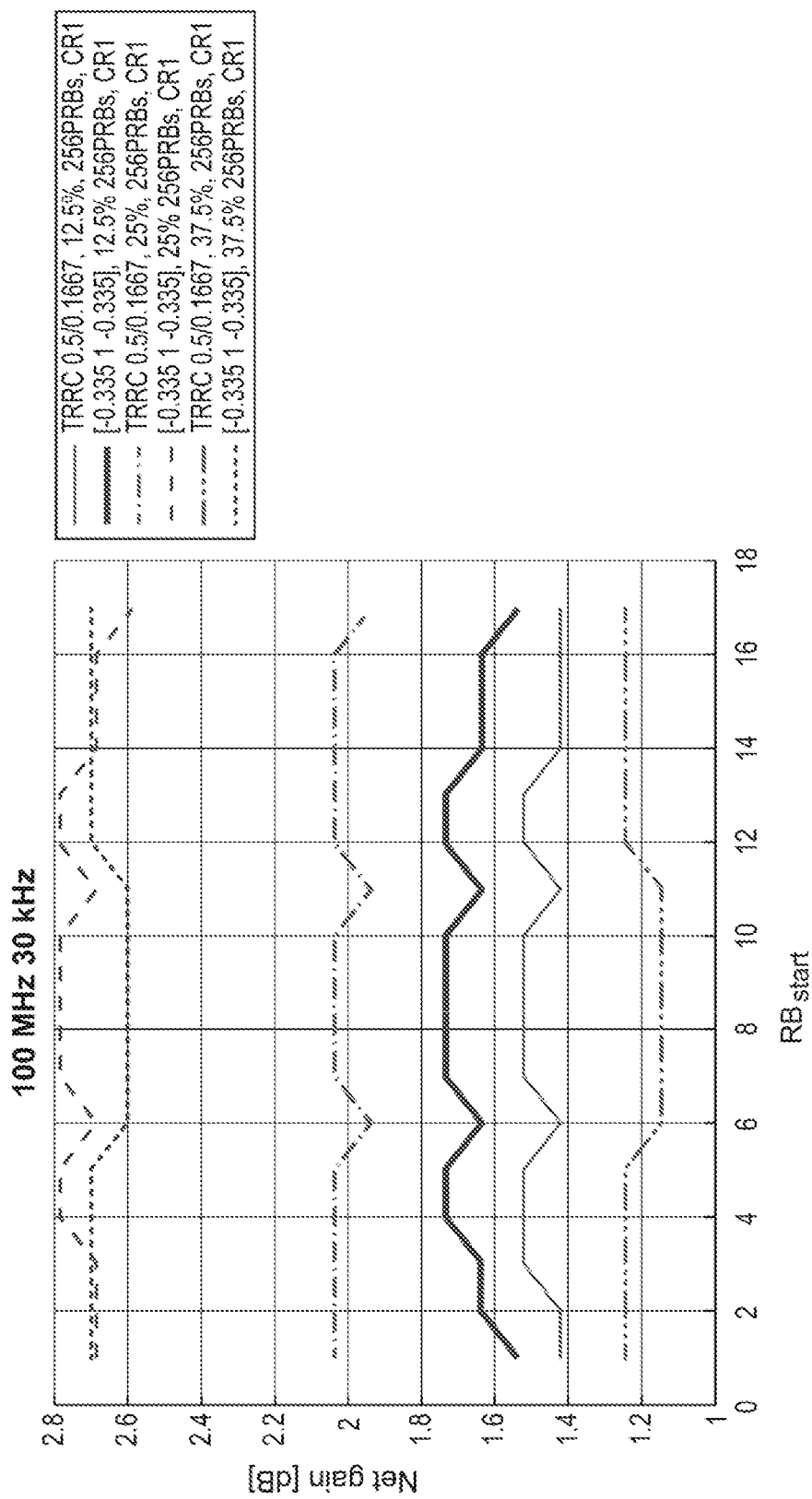
FIG. 2 illustrates an example net (coverage) gain of discrete Fourier transform spread orthogonal frequency division multiplexing (DFT-s-OFDM) with FDSS-spectrum extension (SE).

FIG. 2 illustrates an example net (coverage) gain of DFT-s-OFDM with FDSS-SE over quadrature phase shift keying (QPSK) (without FDSS-SE) with the same spectral efficiency. The QPSK may be for a 256 physical resource block (PRB) transmission for 100 MHz channel bandwidth (BW) with 30 kHz sub-carrier spacing (SCS) for different SE factors, and two different frequency windows (i.e. FDSS filters). It can be seen in FIG. 2 that the FDSS-SE technique may provide close to 3 dB of coverage gain. It may be noted that FIG. 2 considers the extra power available for transmission, and the link performance of the different cases (e.g., legacy and FDSS-SE) with the same spectral efficiency. This means that when SE is used, the coding rate may be increased to compensate for the extra frequency allocation.

UE transmit power for physical uplink shared channel (PUSCH) may be determined by equation (1):

where the transmission power is capped by $P_{CMAX,f,c}(i)$, which is defined as the UE configured maximum output power. The UE can set the $P_{CMAX,f,c}$ value in each slot, as long as the $P_{CMAX,f,c}$ is set within the bounds:

$$P_{CMAX\_L,f,c} \le P_{CMAX\_f,c} \le P_{CMAX\_H,f,c},$$

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c + \Delta MPR_c, A\text{-}MPR_c) + \Delta T_{IB,c} + \Delta T_{C,c} + \Delta T_{RxSRS}, P\text{-}MPR_c)\} \text{ and } P_{CMAX\_H,f,c} = \text{MIN}\{P_{EMAX,c}, P_{PowerClass} - \Delta P_{PowerClass}\}.$$

The terms are in equation (1) are defined in TS38.101-1/38.101-2/38.101-3. It is noted that the gNB is not aware of $P_{CMAX,f,c}(i)$ value that UE uses. However, the gNB knows the upper and lower bound of $P_{CMAX,f,c}(i)$.

Figure 3:
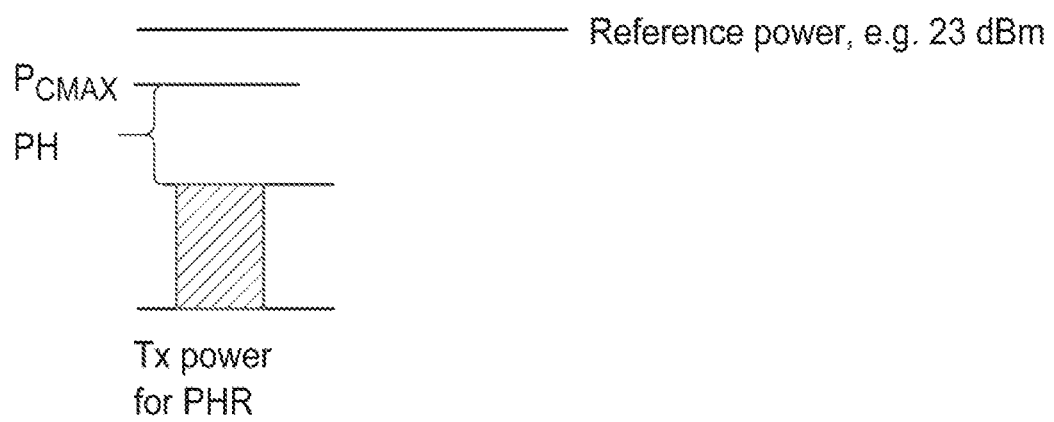
FIG. 3 illustrates an example power headroom using an estimated transmit (Tx) physical uplink shared channel (PUSCH) power.

Power headroom report (PHR) may be a type of medium access control-control element (MAC-CE) that reports the headroom between the current UE Tx power (e.g., estimated power) and the nominal power. The network may use this report value to estimate how much UL BW a UE may use with sufficient power for a specific subframe, and for power control. Additionally, the power headroom may indicate how much transmission power is left for a UE to use in addition to the power being used by a current transmission, as illustrated in FIG. 3. In particular, FIG. 3 illustrates an example power headroom using an estimated Tx PUSCH power. FIG. 3 may be described by formula (2) as follows:

Power Headroom = (2)

UE Max Transmission Power – PUSCH Total Power =

P_CMAX – P_pusch.

The P-PUSCH total power may consider the whole allocated BW (in the case of FDSS with SE, it may cover both in-band and excess-band).

FIG. 4 illustrates an example PHR. In particular, FIG. 4 demonstrates the PHR granularity with a numerical example. As illustrated in FIG. 4, the PHR range may be from −23 . . . −40 dB. FIG. 4 defines the report mapping which may be seen to have 1 dB granularity. In coverage limited scenarios, 1 dB granularity may be considered to be coarse as 1 dB change in Tx power may make a significant difference.

FIG. 5 illustrates an example MPR for UE power class 3. The table in FIG. 5 represents a frequency range 1 (FR1) scenario and UE power class 3 (i.e., max Tx power may be 23 dBm if no boosting is applied). The MPR is shown in FIG. 5 for different modulation schemes including, for example, for both waveforms and for different resource block (RB) allocations. The first row of DFT-s-OFDM shows the MPR for a UE power boost scenario. Also shown in FIG. 5 are MPR values given by $P_{PowerClass}$-MPR which corresponds to the minimum allowed Tx power in dBm in some cases. In these cases, the actual UE configured maximum output power that the UE can provide may be between the minimum requirement MPR values and 23 dBm (or 26 dBm for UE power boosting). The MPR table shown in FIG. 5 may be updated for an FDSS-SE scenario. In practice, this could mean that there will be at least one new row for DFT-s-OFDM FDSS SE. For example, one of the rows could be applied in the case without power boost, where MPR≥0 dB. Another row could be defined for the cases when power boost is applied. In these cases, MPR could have also negative values. However, the number of UL slots could be restricted accordingly.

Figure 6:
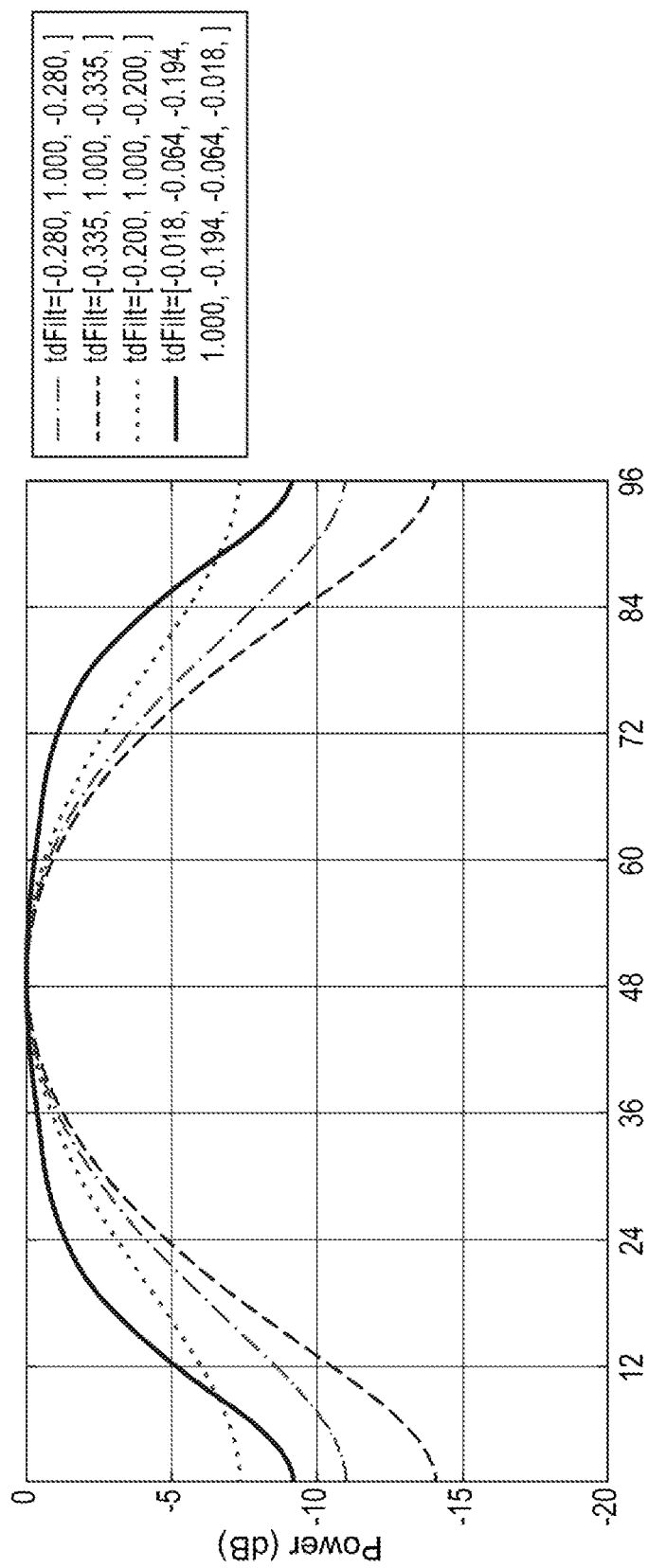
FIG. 6 illustrates an example power spectral density (PSD) for different FDSS filters.

Conventionally, UL Rx performance has exhibited several problems. For instance, there may be a trade-off between Tx performance and Rx performance. FDSS-SE may function to improve the Tx performance. This can be possible at least because FDSS-SE may allow for the reduction of output backoff of the PA (while keeping the same Tx signal quality). However, typically the Rx performance is reduced to some extent due to the FDSS-SE. The net gain combining both Tx and Rx ends may be highly positive, as shown in the example of FIG. 2. Another problem is that the power distribution over different REs is not uniform when FDSS with or without SE is used, as illustrated in FIG. 6. In particular, FIG. 6 illustrates an example power spectral density (PSD) for different FDSS filters satisfying radio frequency (RF) requirements and spectrum flatness requirements. Considerations have been made for UEs to report the power ratio between extension spectrum and non-extension spectrum in an effort to help the base station (BS) allocate resources to make the best use of transmission power and determine receiver operation. Although this type of reporting may be beneficial to the gNB, the problem is that this ratio may not give reasonable information of the actual filter shape in different cases. Thus, it may not be possible to sufficiently optimize the use of transmit power (e.g., correct power control formula with FDSS based waveforms, adapt frequency domain resource assignment (FDRA) and RS allocation accordingly), and achieve the best tradeoff of receiver operation by partly discarding or completely discarding the excess-band (best performance-complexity tradeoff with advanced receiver).

Other problems have been observed in the power distribution changes with different filters for FDSS with or without SE. The filter for FDSS may be transparent to the gNB and not defined in the specifications. As such, the gNB may not be aware of the filter power distribution. Further, the UE may use different filters with different configurations (e.g., SE factor, etc.). However, there is still a possibility of a potential incorrect power control if information on filter power distribution is unknown at the gNB. Furthermore, depending on the gNB scheduling decision (such as # of RBs, MCS) and receiver implementation, as well as UE's FDSS filter selection, the net gain from FDSS-SE can be positive or negative. It may be beneficial for gNB to avoid cases with negative net gain by allocating PUSCH without FDSS-SE in these cases. It should be noted that when adapting the UE Tx power, the gNB only knows the MPR requirement, as well as PHR reported by the UE.

Additionally, the UE transmit power for PUSCH determined by equation (1) and used in PHR may lead to inaccurate estimation since the uniform power distribution assumption does not hold with FDSS. Furthermore, MPR and PHR are single scalar parameters that are defined/indicated for the entire allocated BW, and current specifications do not support the indications of a band segment that is specific to MPR/PHR (in-band segment, excess-band, or part of excess-band).

The actual Tx power level and maximum power supported by the UE is known only by the UE, and current specifications only define the requirement for UE minimum Tx power for a certain MCS. Additionally, PHR may be coarse (see FIG. 4) (e.g., in resolution). Since PHR relates to the transmission settings and waveform that the UE used for PHR determination, PHR may differ from power headroom for transmissions to be scheduled or recently changed. The power control formula cannot account for the power difference between FDSS power distribution and the uniform power distribution assumption if the power distribution is unknown to the gNB.

For better performance-complexity tradeoff, the gNB receiver may partly use or completely use the excess-band that contains a partial duplicate of in-band data (i.e, a fraction of it). In this case, the gNB receiver performance gain may be negligible when the excess-band power is too low with an aggressive filter. The gNB may also select the best tradeoff between performance gain and the additional computational complexity with advanced receiver by using partly or completely the excess-band. In addition, the PHR report, PUSCH power control, and MPR do not consider the peculiarities of FDSS with or without SE to solve the described problems. Thus, they do not allow the gNB to best use the transmission power in its FDRA, RS allocation decision, power control, nor its receiver operation mainly with FDSS-SE.

In view of the above drawbacks, certain example embodiments may provide an adequate signaling and a more accurate indication method for the gNB so that the gNB may optimize transmit power usage of FDSS-based waveforms, and determine the best receiver operation.

In certain example embodiments, UE assistance signaling may consider FDSS with or without SE peculiarities to allow more optimal gNB decisions based on UE specific FDSS filter power distribution, and correction of current NR power control imprecisions with FDSS-SE. The UE assistance signaling may also indicate more details of the FDSS filter power distribution over FDRA BW using various methods.

For instance, in certain example embodiments, the UE assistance signaling may implement a power-based indication method for band segment(s) within a total BW allocation. According to certain example embodiments, this method may provide a signaling solution update that is specific for FDSS-based waveforms. For instance, the UE may determine the size of a first part of the frequency band segment, and a second part of the frequency band segment based on a configuration by using radio resource control (RRC) signaling. In some example embodiments, the configuration parameters may include, but not limited to, for example, FDSS with or with SE, an SE factor value if any, MCS, RB allocation, and/or allocated RB position (e.g., inner/outer).

Continuing with the power-based indication method, the UE may use FDSS-based waveforms to determine a value indicative of a PSD difference between the first part of the frequency band segment and the second part of the frequency band segment. In some example embodiments, the frequency band segment may be at least one of a total BW allocation including in-band and excess-band, or a band segment or a fraction of the total BW allocation. As to the band segment or a fraction of the total BW allocation, a secondary in-band and a secondary excess-band may be defined. For instance, the secondary in-band/excess-band may be determined from a primary in-band/excess-band (e.g., secondary excess-band may be double the primary excess-band).

In the power-based indication method, the frequency segments may be configurable, by, for example, the gNB/network, and the frequency segments may be configurable within the total BW allocation, and the PSD difference may be indicated by the UE as part of a PHR signaling solution. The UE may also indicate a filter PSD difference relative to a main frequency band segment, or relative to an adjacent band segment to achieve better granularity particularly if there are more than two band segments. In some example embodiments, the adjacent band may be adjacent to a band concerned in, for example, the PHR signaling, assuming that the allocated BW is divided into band segments as follows: band segment 1, band 2, band 3, band 4, band 5, etc. The PHR for band i(1, 2, 4, 5,) may be relative to the main band (e.g., band segment 3, or band segment resulting from segments 2+3+4). Alternatively, the PHR for band segment i may be relative to band segment i−1, or i+1 (left or right adjacent segment to the concerned segment in PHR).

According to certain example embodiments, the UE assistance signaling may also include a bandwidth-based indication method corresponding to pre-defined/configurable power containment percentage(s). This method may provide a new signaling-based solution for FDSS-based waveforms. For instance, according to certain example embodiments, using FDSS-based waveforms with or without SE, the UE may determine at least one value indicative of a frequency band segment corresponding to a power containment ratio/percentage (e.g., 98% of total power, etc.). In some example embodiments, the power containment percentage(s) may be configurable by the gNB or be pre-defined between the gNB and the UE.

In certain example embodiments, the at least one value indicated to the gNB may be an index corresponding to a pre-determined or configurable BW ratio between a first part and a second part of a frequency segment within the total allocated BW. The frequency segment part (e.g., the first part and/or the second part) may include at least one of a total BW allocation and/or a band segment or a fraction of the total BW allocation. The band segment or a fraction of the total BW allocation may refer to, for example, the in-band and the excess-band. For instance, the BW indication corresponding to the power containment may be a ratio relative to the total BW allocation. Additionally, the BW indication corresponding to the power containment may be the band segment or the fraction of the total BW allocation may correspond to a ratio relative to the band segment (e.g., excess-band).

Figure 7:
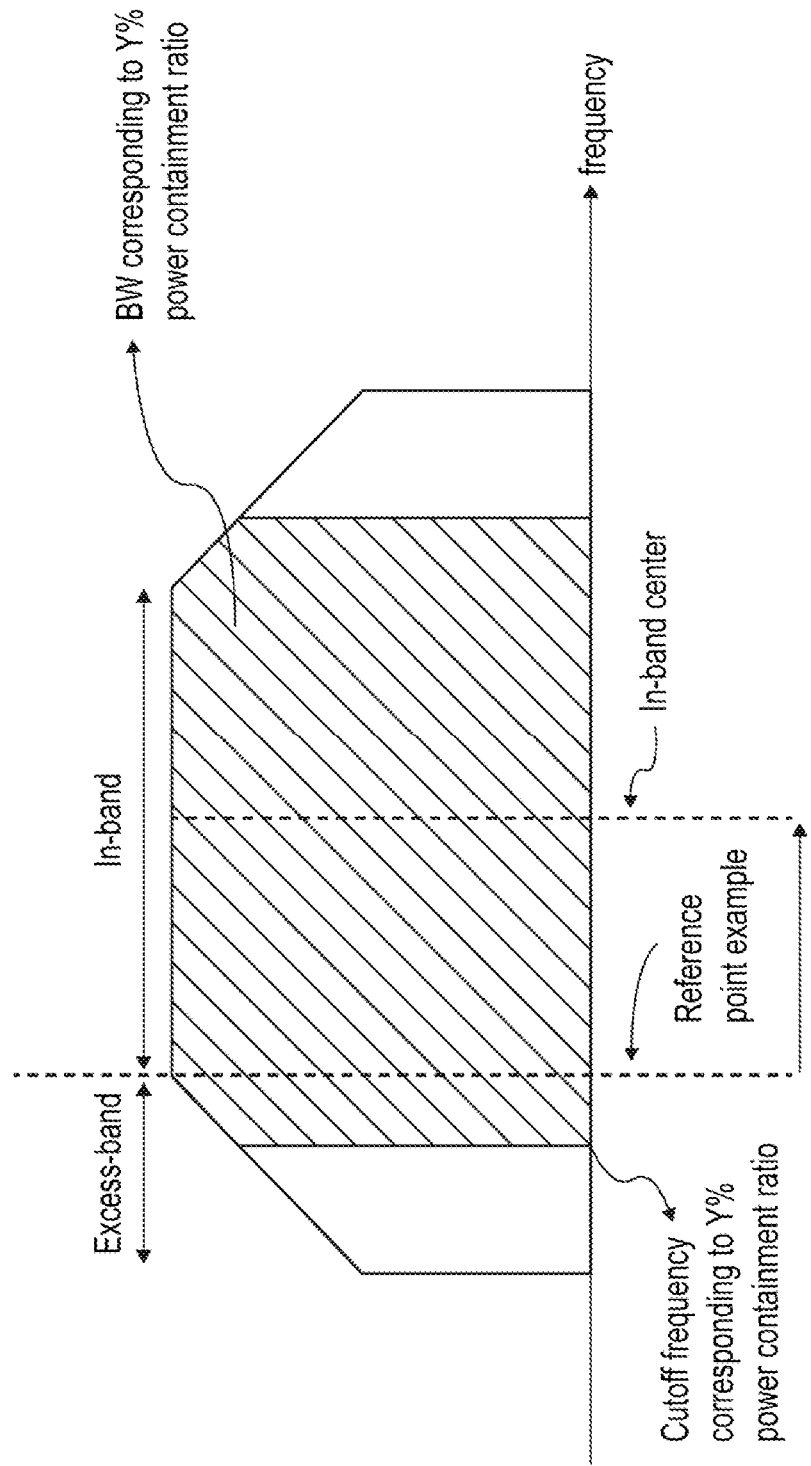
FIG. 7 illustrates an example of reference point and positive indices for resource element/physical resource block (RE/PRB) corresponding to a cutoff frequency fc, according to certain example embodiments.

In some example embodiments, the at least one value indicated to the gNB may be an index corresponding to a frequency cut-off position (e.g., a mapping to RE/PRB position). For instance, the index may be defined relative to a reference point (e.g., excess-band/in-band boundary). In other example embodiments, the index may be defined with a positive or a negative value to indicate a direction relative to the reference point. The direction may be used for creating an axis for the RE/PRB index with the reference point as an origin, and allow the indication for cutoff frequency in both directions relative to the reference point (e.g., after/before reference point). This example is illustrated in FIG. 7, which illustrates an example of positive indices for RE/PRB corresponding to a cutoff frequency fc, according to certain example embodiments. For instance, as illustrated in FIG. 7, in one option, the positive direction starts from the reference point as the in-band center is approached (i.e., negative index for PRB/RE corresponding to fc). Alternatively, in a second option, the positive direction starts from the reference point while approaching towards the edge of the total allocation (i.e., positive index for RB/RE corresponding to fc), or any other definition negative value for indices that indicate the opposite for any pre-defined option. In some example embodiments, the UE/gNB may determine/indicate/interpret the index of RE/PRB corresponding to the cutoff frequency using a common predefined language (i.e., at least the reference point and positive direction are pre-defined). In further example embodiments, the index may be interpreted differently based on different total BW allocations (i.e., resolution scaling). With the at least one value defined, the UE may report more than one indication of the value for different power containment percentages.

As described in the example embodiments above, the UE may be capable of providing assistance signaling and indication for filter power distribution in FDSS with or without SE to the gNB. In doing so, the gNB may be able to take more optimal decisions and thereby avoid the problems previously described.

Referring to the power-based indication method described above, the FDSS specific indication by the UE may be based on a power-based indication using PHR for a specific band segment within FDRA (e.g., in-band, excess-band, or any other band segment within FDRA BW). According to certain example embodiments, the power indication may be relative to a main PHR for the entire FDRA and specified as "delta-PHR" for a specific part of the FDRA (e.g., band2). Delta-PHR may be expressed as (delta_PHR= $P_{band1+band2}^{total} - P_{band2}^{total}$ where any possible additional imprecisions due to unknown exact Pcmax by the gNB may be removed. Alternatively, an average PSD difference between the average power of two band segments may be determined by ($\overline{P}_{band1} - \overline{P}_{band2}$), which may be used instead of the total power-based PHR. When the UE utilizes an aggressive filter (e.g., filter with tdFilt=[−0.335, 1.000, −0.335] in FIG. 6), the PSD difference may be large, and when the UE utilizes a less aggressive filter (e.g., filter with tdFilt=tdFilt=[−0.200, 1.000, −0.200] in FIG. 6), the PSD difference may be small (er) The aggressive or less aggressive filter may be an indication for the steepness of the transition from the in-band center to the edge band.

In certain example embodiments signaling may be made by the UE by two bits. For example, there may be three PSD threshold parameters A<B,C shown in Table 1 below.

TABLE 1

| | PSD threshold parameters |
|---|---|
| Signaling bits | PSD difference (dB)<br>A < B < C |
| 00 | <A |
| 01 | A ... B |
| 10 | B ... C |
| 11 | >C |

Figure 8:
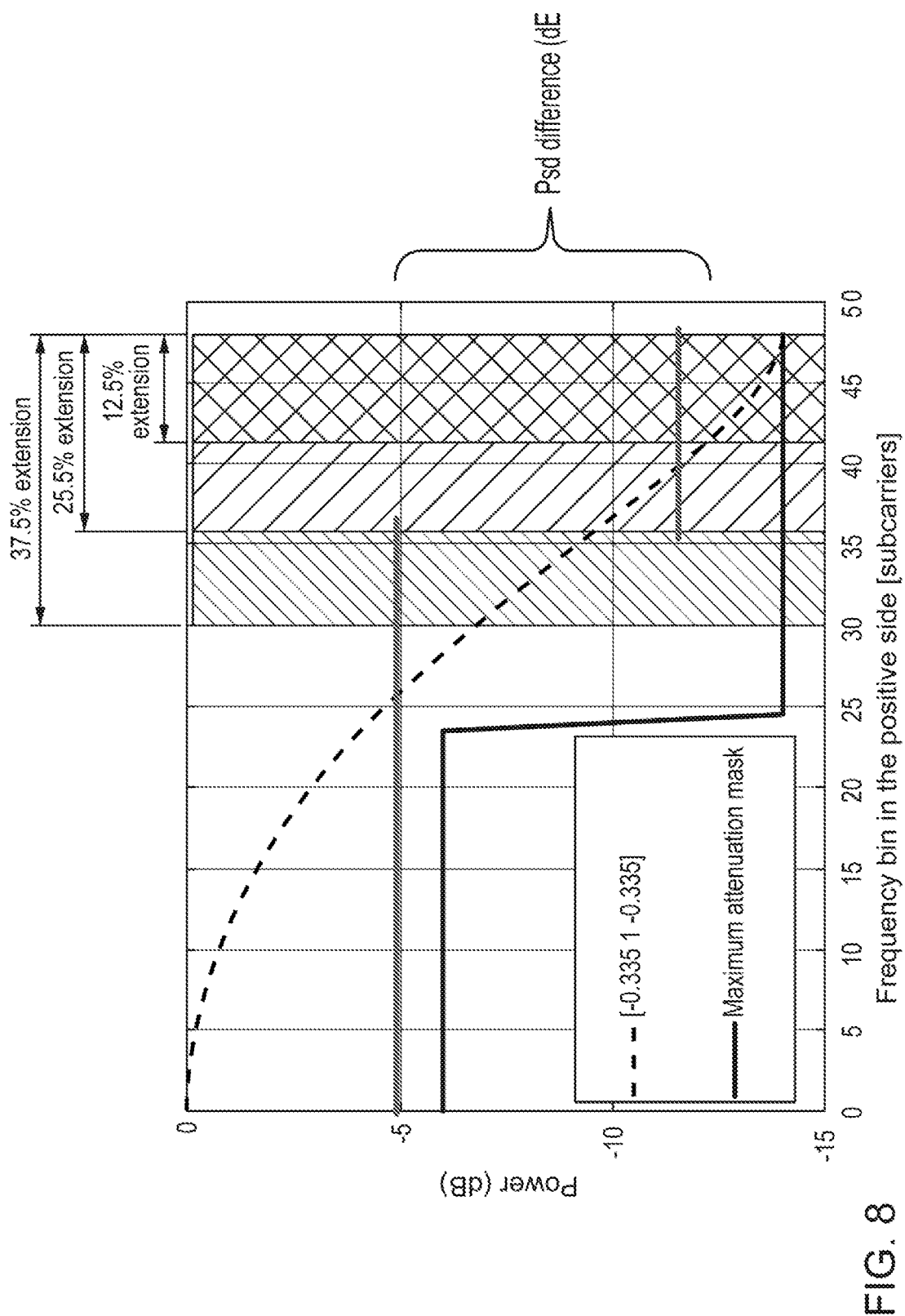
FIG. 8 illustrates a power and frequency bin distribution, according to certain example embodiments.

Additionally, the PSD difference may be shown in FIG. 8, which illustrates a power and frequency bin distribution showing the PSD difference and extension amounts, according to certain example embodiments.

Figure 9:
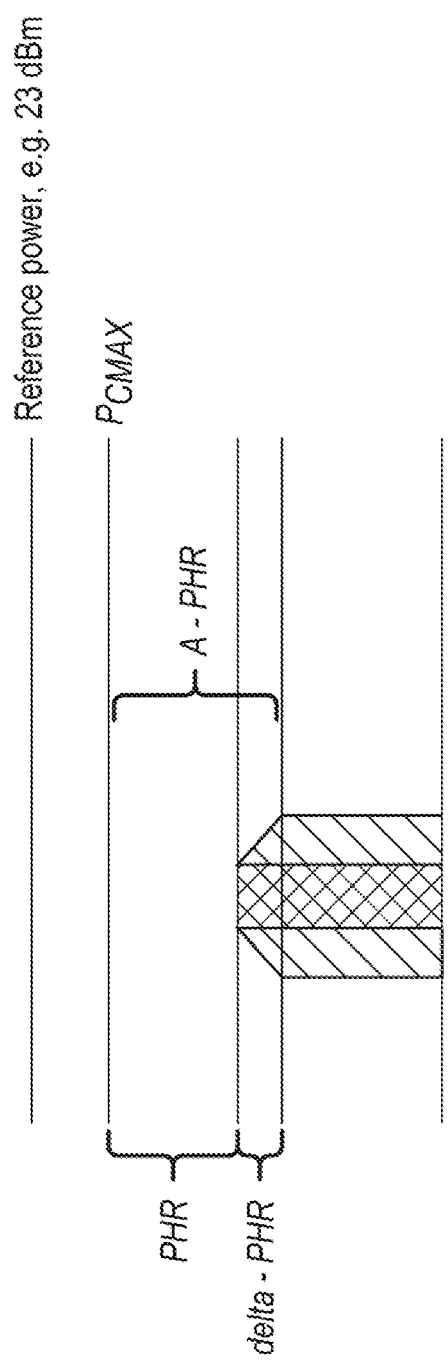
FIG. 9 illustrates an example power indication in PHR, according to certain example embodiments.

FIG. 9 illustrates an example power indication in PHR, according to certain example embodiments. As illustrated in FIG. 8, a power indication relative to UE max transmission power is indicated as an additional PHR (e.g., A-PHR) for a specific segment of the FDRA. The A-PHR may be complementary information to the original PHR. Previous delta-PHR options between different band segments (based on total powers or average powers) may be allowed for more accurate PHR dB granularity with fewer bits than an additional A-PHR. In this example embodiment, the power indication may use a power ratio between two band segments (e.g., relative to the total FDRA band, excess-band, etc.). Signaling with minimal bits may also be used similar to the PSD difference table, where a set of band1/band2 power ratios are defined. As described above, the UE under the power-based indication method may report more than one power indication for different segments within the allocated BW.

Figure 10:
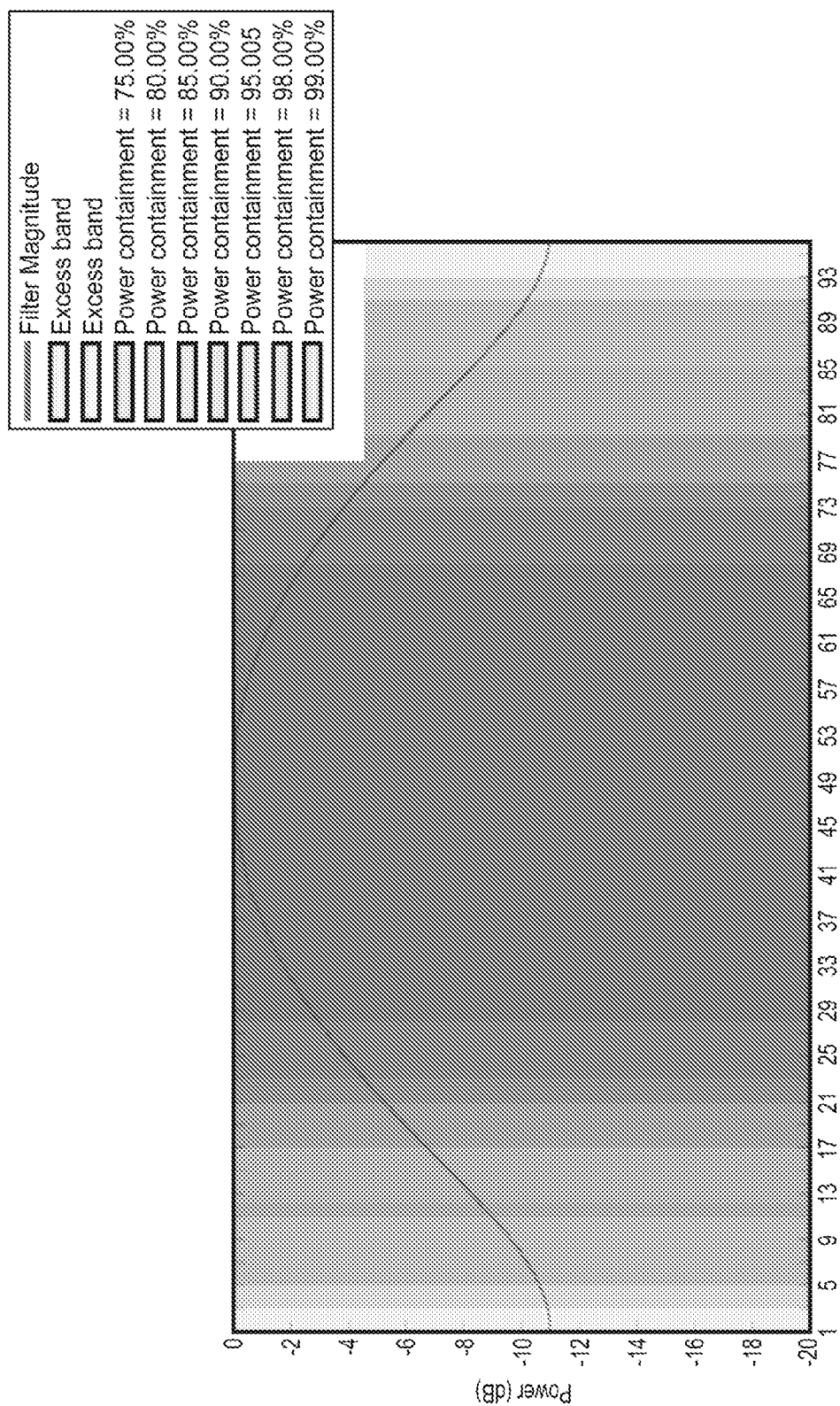
FIG. 10 illustrates an example BW indication corresponding to a power containment percentage, according to certain example embodiments.

Referring to the bandwidth-based indication method described above, the bandwidth-based indication(s) may correspond to power containment(s). In some example embodiments, other UE possible indications may be considered for FDSS with or without SE. With the bandwidth-based indication method, it may be possible to provide a more accurate indication of the filter power distribution than a power ratio/difference between band1 and band2 (e.g., excess-band and in-band). As previously described, the FDSS power distribution indication may be based on a BW indication corresponding to a power containment percentage Y % (i.e., the at least one value indicative of the frequency band segment), as illustrated in FIG. 10. The power containment percentages may be different between different band segments even within the excess-band (see also FIG. 6).

According to some example embodiments, the bandwidth-based indication method may improve accuracy, which may allow for the partial use of the excess-band at the gNB for the best complexity vs performance gain tradeoff by using only the spectrum segment with sufficient power (e.g., 98%, 99% of total power). The bandwidth-based indication method may also optimize the gNB decisions including, for example, RS pattern/allocation, and SE factor. In certain example embodiments, the previous PSD difference or power ratio indications may indirectly indicate the Y % power containment for in-band or excess-band. However, the PSD difference or power ratio indications may not precisely indicate the useful band segment of the excess-band or more details about the steepness of power change within the in-band or excess-band (e.g., 50% or less of excess-band may carry most of the power with an aggressive filter).

In certain example embodiments, the bandwidth-based indication method may enable the UE to provide power containment indication based on a BW indication. This information may allow the gNB to select the best performance-complexity tradeoff by neglecting partly or completely the excess-band with negligible power containment. The indication may also be in an opposite direction to a previous example for bandwidth-based indication using a power containment ratio. For instance, Y % may represent a power containment ratio that is predefined and/or configured by the gNB. The UE may then determine the corresponding cutoff frequency or BW percentage, and send its indication to the gNB. Additionally, the BW segments may be predefined and/or configured by the gNB. The UE may then determine the corresponding power containment ratio within this band segment, and send its indication to the gNB.

In other example embodiments, the Y % may be configurable and indicated by gNB signaling, or it may be a predefined value(s) determined by the gNB. Additionally, signaling of the Y % is not limited to MAC-CE. According to other example embodiments, any PRB allocation and SE factor (if any) may be used with the bandwidth-based indication corresponding to the power containment Y %. In some example embodiments, the UE may indicate more than one bandwidth-based indication corresponding to Y % of the total power to allow at least better optimization of possible new future coverage enhancement concepts.

According to certain example embodiments, the bandwidth-based indication corresponding to Y % power containment may be based on a percentage of allocated BW (X %), which may correspond to a percentage of the total-band or excess-band. A set of values (i.e., values corresponding to A, B, C, D in Table 2) may be predefined or configured by higher layers, and the values may be mapped to a few bits as shown in Table 2. For example, there may be four possible BW X % with two signaling bits, where the nearest BW percentage X corresponding to power containment Y % is indicated.

TABLE 2

| | Signaling bits in relation to BW percentage |
|---|---|
| Signaling bits | BW percentage (X %) relative to FDRA BW or excess-band, etc. |
| 00 | A |
| 01 | B |
| 10 | C |
| 11 | D |

Figure 11:
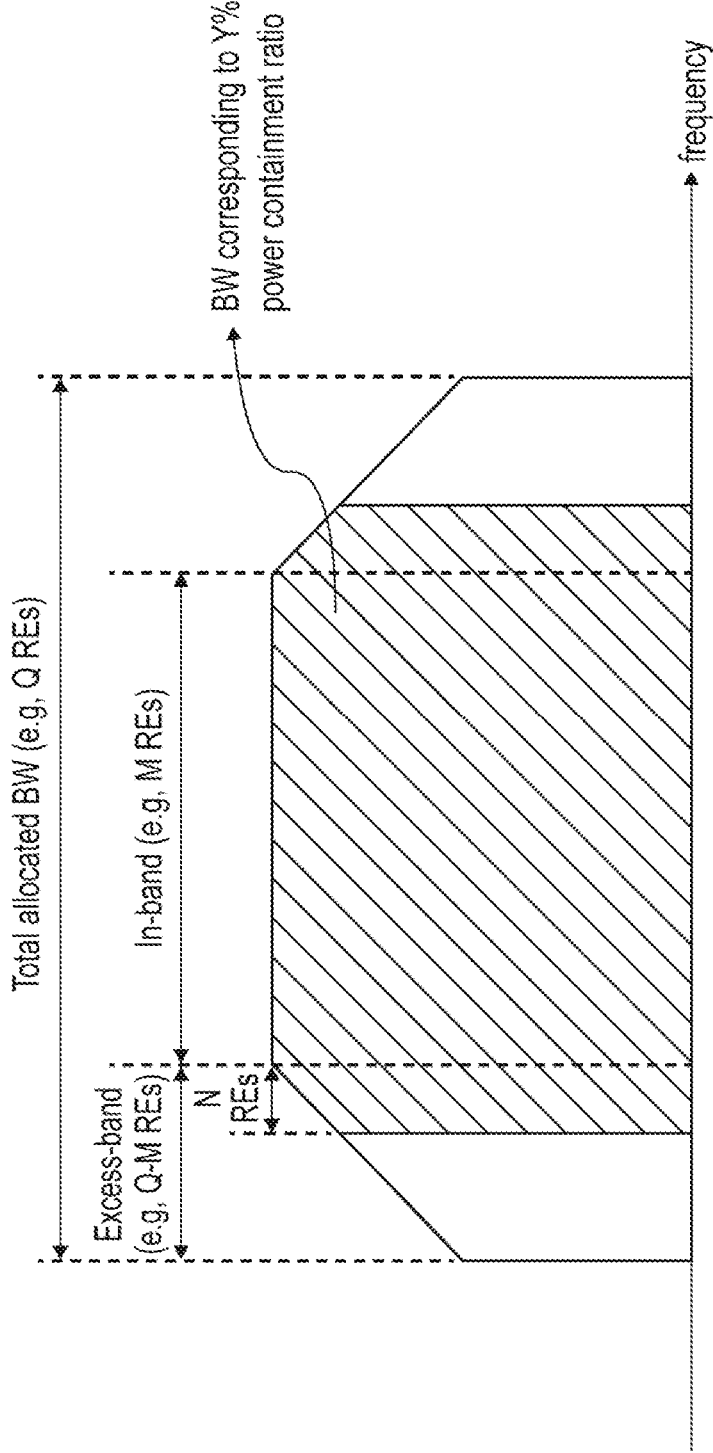
FIG. 11 illustrates an example of the excess-band for bandwidth-based indication corresponding to a power containment ratio, according to certain example embodiments.

According to certain example embodiments, when X % is relative to the excess-band, then {A, B, C, D} may be {25, 50, 75, 100}. In certain example embodiments, X % may be a BW percentage of the excess-band (or other band segment) that corresponds with the in-band to a power containment Y %. FIG. 11 illustrates an example of the excess-band for bandwidth-based indication corresponding to a power containment ratio, according to certain example embodiments. As illustrated in FIG. 11, $$\frac{N}{Q-M} * 100$$

may be a BW indication (X % relative to excess-band) that corresponds with the in-band to Y % power concentration ratio. As an example, a 00 indication means at least or approximately Y=98% of total power is within the in-band accompanied by X=25% of the excess-bands. According to other example embodiments, when X % is relative to the entire FDRA BW, then {A, B, C, D} may be presenting high percentage values such as {80, 95, 98, 99%}. As illustrated in FIG. 11, $$\frac{M+2N}{Q} * 100$$

may be a BW indication (X % relative to a total allocated BW) that corresponds to Y % power containment ratio. As an example, at least or approximately Y=98% of the total power may be within 80% of the FDRA BW. This option may be suitable with FDSS without SE, which may already be standardized with pi/2 BPSK, and where further enhancements may be added using such indication.

In certain example embodiments, the BW based indication corresponding to Y % power containment may be based on a PRB/RE index delimiting the start/end of the BW with the considered Y % power containment percentage. For instance, as previously described, the PRB/RE index may be an index corresponding to a frequency cut-off position. As described above, the PRB/RE index may be defined relative to a reference point. For example, the in-band edge or the excess-band/in-band boundary may be the index reference point, or the axis origin to use a few bits indication. As one example embodiment, the RE index 12 or PRB index 1 may correspond to index 0. The index may also be decreasing as the in-band center becomes closer, and vice versa.

As described above, the index may be defined with a positive or a negative value to indicate a direction relative to a reference point. For instance, a few bits indication may be mapped to certain RE or PRB indices. For example, 2-bit with a set of indices {−1, 0, 1, 2} may be used where index 0 is the in-band edge, and the negative values correspond to RE or PRB towards the in-band center. As also described above, the index may be interpreted differently with different total BW allocation. For instance, the resolution (the equivalent distance in RE or PRB between consecutive indices) may be the same for any FDRA allocation. Alternatively, in other example embodiments, the resolution may be scaled according to the allocated FDRA BW ("$BW_a$") and pre-defined FDRA ("$BW_{predefined}$") to cover the higher part of bands with a minimum number of bits. These indices may be interpreted with any FDRA ("$BW_a$"), which may be the same as the default indices (e.g., {−1, 0, 1, 2}) scaled by $BW_a/BW_{predefined}$, and then rounded to the nearest RE or PRB. This may mean that the resolution is doubled when doubling FDRA allocation and maintaining the same number of signaling bits.

Figure 12:
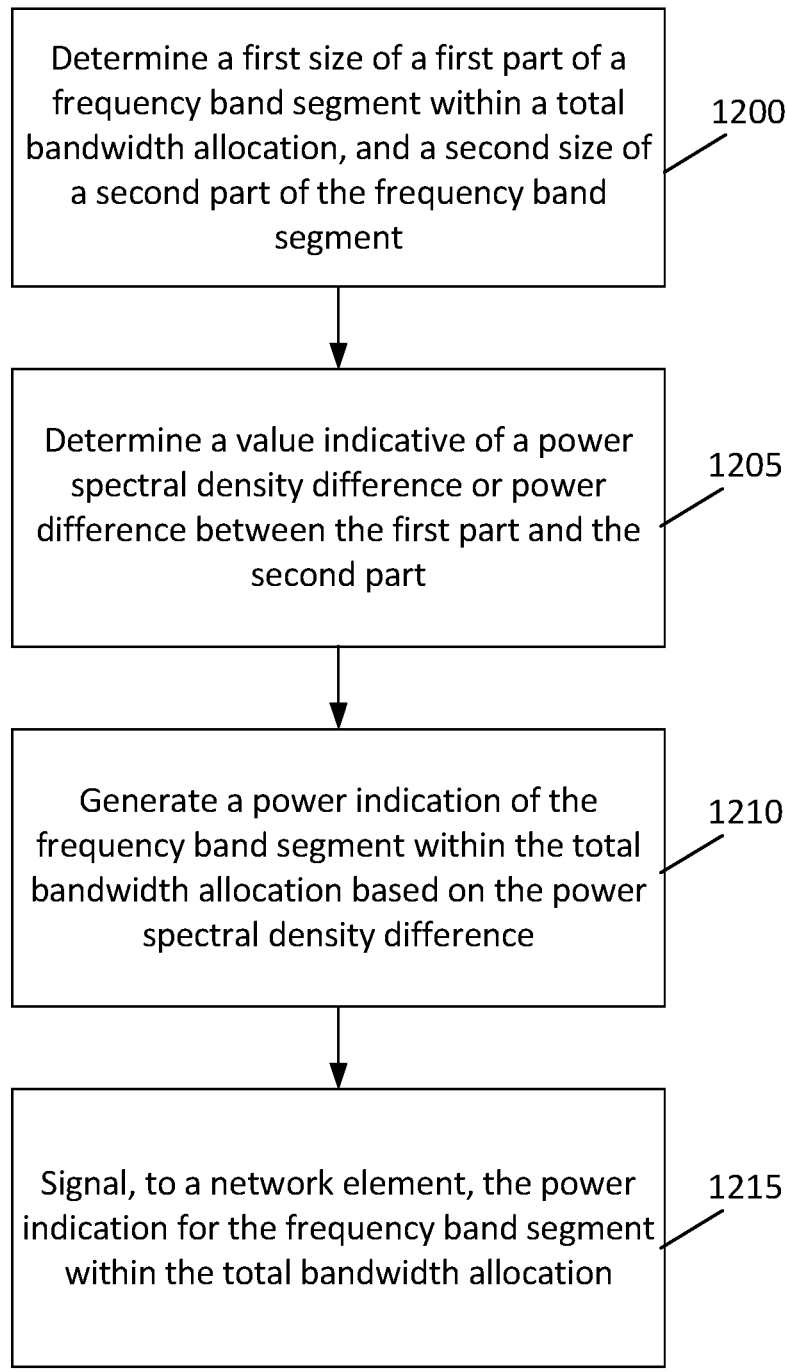
FIG. 12 illustrates an example flow diagram of a method, according to certain example embodiments.

FIG. 12 illustrates an example flow diagram of a method, according to certain example embodiments. In an example embodiment, the method of FIG. 12 may be performed by a network entity, or a group of multiple network elements in a 3GPP system, such as LTE or 5G-NR. For instance, in an example embodiment, the method of FIG. 10 may be performed by a UE similar to one of apparatuses 10 or 20 illustrated in FIG. 15.

According to certain example embodiments, the method of FIG. 12 may include, at 1200, determining a first size of a first part of a frequency band segment within a total bandwidth allocation, and a second size of a second part of the frequency band segment. The method may also include, at 1205, determining a value indicative of a power spectral density difference or power difference between the first part and the second part. The method may further include, at 1210, generating a power indication of the frequency band segment within the total bandwidth allocation based on the power spectral density difference. In addition, the method may include, at 1215, signaling, to a network element, the power indication for the frequency band segment within the total bandwidth allocation.

According to certain example embodiments, the first part of the frequency band segment and the second part of the frequency band segment are at least one of non-overlapping or partially overlapping. According to some example embodiments, the power indication may be signaled as part of a power headroom report for the frequency band segment. According to some example embodiments, the frequency band segment may be at least one of a total allocation comprising in-band, excess-band, or any band segment within the total allocation, or a band segment or a fraction of the total allocation. According to other example embodiments, the frequency band segment may be configurable within the total bandwidth allocation.

In certain example embodiments, the power indication may be signaled relative to a main frequency band segment or relative to an adjacent frequency band segment. In some example embodiments, the power indication may be signaled by at least one bit, and the power indication may include a power indication relative to a user equipment max transmission power.

Figure 13:
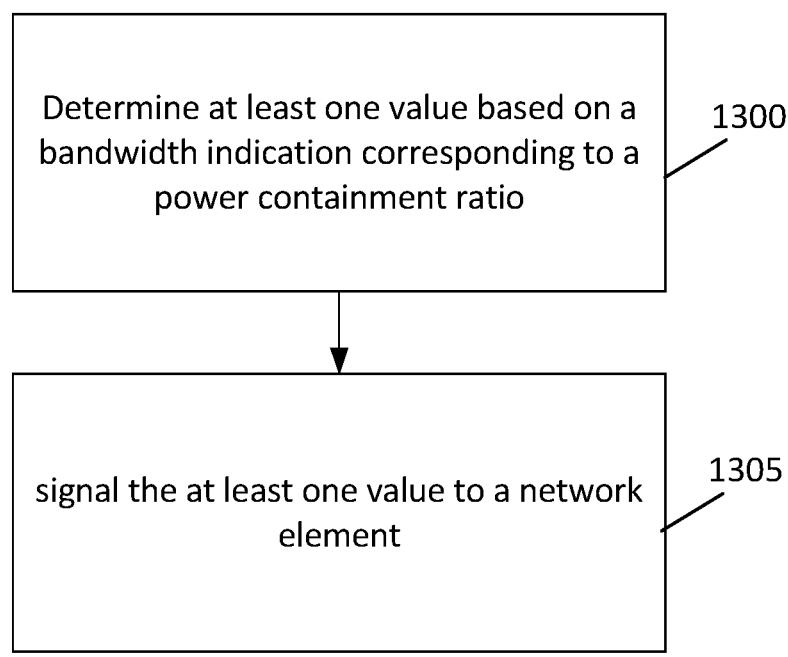
FIG. 13 illustrates an example flow diagram of another method, according to certain example embodiments.

FIG. 13 an example flow diagram of a method, according to certain example embodiments. In an example embodiment, the method of FIG. 13 may be performed by a network entity, or a group of multiple network elements in a 3GPP system, such as LTE or 5G-NR. For instance, in an example embodiment, the method of FIG. 13 may be performed by a UE similar to one of apparatuses 10 or 20 illustrated in FIG. 15.

According to certain example embodiments, the method of FIG. 13 may include, at 1300, determining at least one value based on a bandwidth indication corresponding to a power containment ratio. According to certain example embodiments, the determination may be performed by using a transmitter filter with a frequency domain spectrum shaping waveform. The method may also include, at 1305, signaling the at least one value to a network element.

According to certain example embodiments, the band indication corresponding to the power containment ratio may be based on at least one of a first index corresponding to a pre-determined or configurable bandwidth ratio between a first and a second part of a frequency segment within a total allocated bandwidth, or a second index corresponding to a frequency cut-off position that maps to a resource element or a physical resource block. According to some example embodiments, the first part and the second part of the frequency segment may be at least one of a ratio relative to the total allocated bandwidth, or a ratio relative to a band segment of the total allocated bandwidth. According to other example embodiments, the second index may be defined as at least one of a value relative to a reference point, the reference point corresponding to an excess-band boundary, an in-band boundary, or any other predefined reference point used by the UE and gNB, a value as a positive value or a negative value to indicate a direction of the resource element or the physical resource block relative to the reference point, or a value that is interpreted differently depending on different allocations of the total bandwidth.

Figure 14:
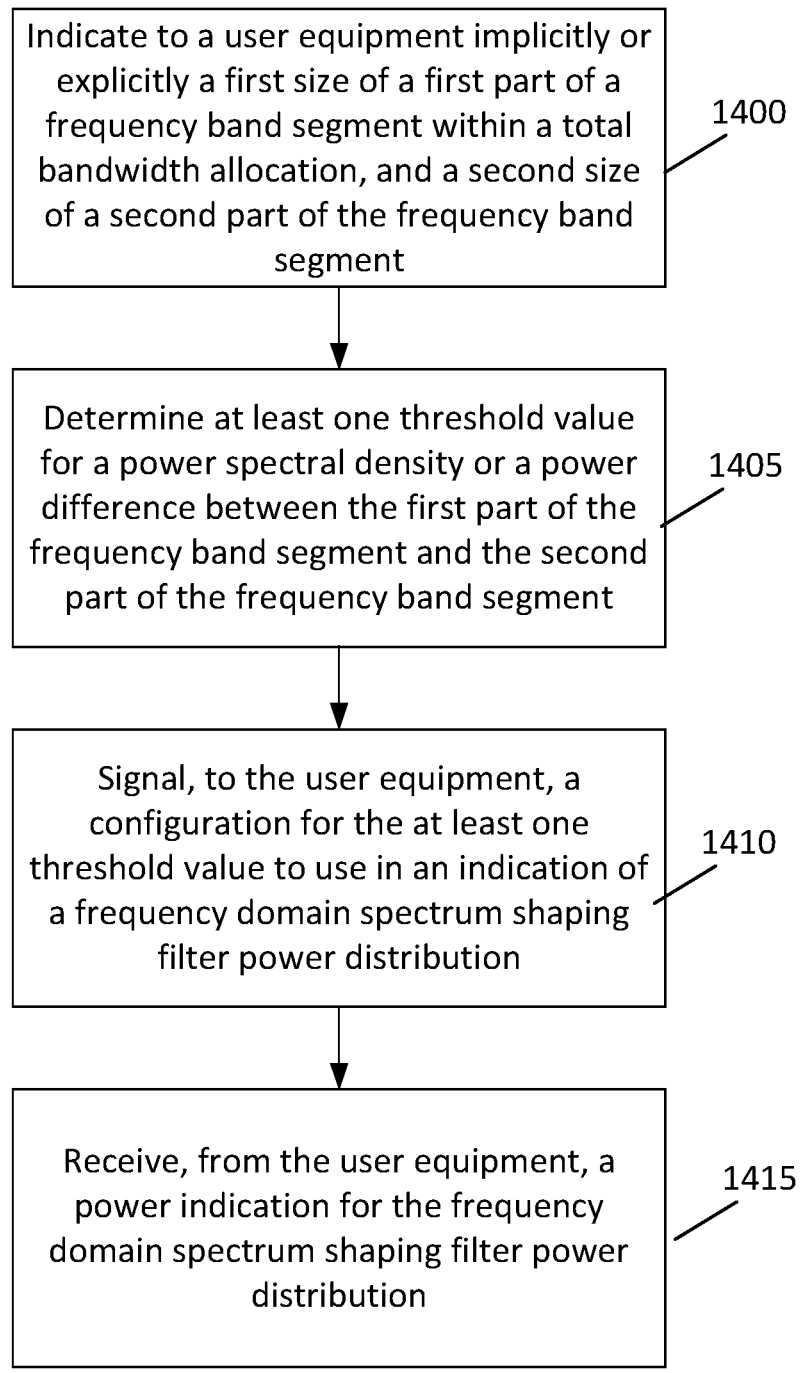
FIG. 14 illustrates an example flow diagram of a further method, according to certain example embodiments.

FIG. 14 illustrates an example flow diagram of a method, according to certain example embodiments. In an example embodiment, the method of FIG. 14 may be performed by a network entity, or a group of multiple network elements in a 3GPP system, such as LTE or 5G-NR. For instance, in an example embodiment, the method of FIG. 14 may be performed by a gNB or network similar to one of apparatuses 10 or 20 illustrated in FIG. 15.

According to certain example embodiments, the method of FIG. 13 may include, at 1400, indicating to a user equipment implicitly or explicitly a first size of a first part of a frequency band segment within a total bandwidth allocation, and a second size of a second part of the frequency band segment. The method may also include, at 1405, determining at least one threshold value for a power spectral density or a power difference between the first part of the frequency band segment and the second part of the frequency band segment. The method may further include, at 1410, signaling, to the user equipment, a configuration for the at least one threshold value to use in an indication of a frequency domain spectrum shaping filter power distribution. In addition, the method may include, at 1415, receiving, from the user equipment, a power indication for the frequency domain spectrum shaping filter power distribution.

According to certain example embodiments, the at least one threshold value is determined based on at least one of one configuration parameter for frequency domain spectrum shaping with or without spectrum extension, or the first part of the frequency band segment or the second part of the frequency band segment. According to some example embodiments, the at least one threshold value may implicitly indicate to the user equipment at least one of the first part or the second part. According to other example embodiments, the first part of the frequency band segment and the second part of the frequency band segment may be at least one of non-overlapping, or partially overlapping.

In certain example embodiments, the power indication may be received as part of a power headroom report for the frequency band segment. In some example embodiments, the frequency band segment is at least one of a total allocation comprising in-band, excess-band, or any band segment within the total allocation, or a band segment or a fraction of the total allocation.

Figure 15:
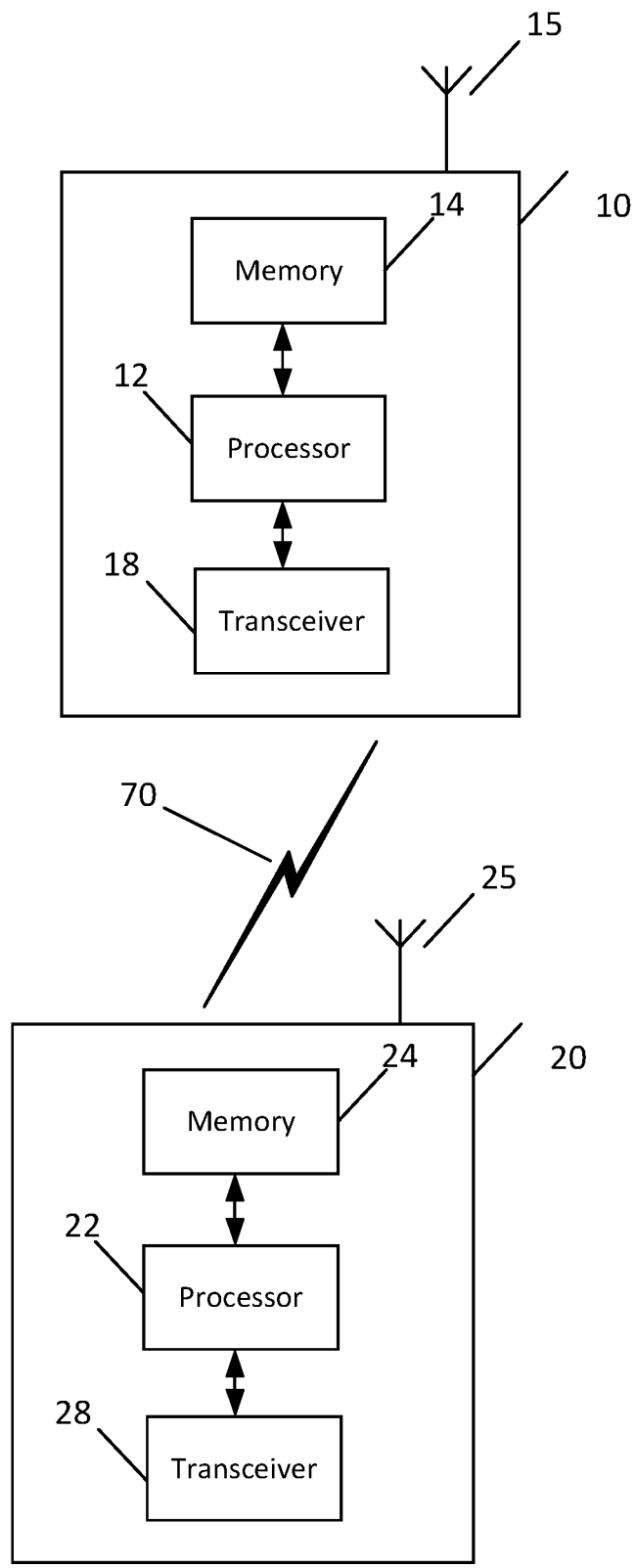
FIG. 15 illustrates a set of apparatuses, according to certain example embodiments.

FIG. 15 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 15.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 10 may include components or features not shown in FIG. 15.

As illustrated in the example of FIG. 15, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 15, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming communication message, formatting of information, and overall control of the apparatus 10, including processes and examples illustrated in FIGS. 1-13.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-13.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digitalto-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be, included in or may form a part of transceiving circuitry.

For instance, in certain example embodiments, apparatus 10 may be controlled by memory 14 and processor 12 to determine a first size of a first part of a frequency band segment within a total bandwidth allocation, and a second size of a second part of the frequency band segment. Apparatus 10 may also be controlled by memory 14 and processor 12 to determine a value indicative of a power spectral density difference or power difference between the first part and the second part. Apparatus 10 may further be controlled by memory 14 and processor 12 to generate a power indication of the frequency band segment within the total bandwidth allocation based on the power spectral density difference. In addition, apparatus 10 may be controlled by memory 14 and processor 12 to signal, to a network element, the power indication for the frequency band segment within the total bandwidth allocation.

In other example embodiments, apparatus 10 may be controlled by memory 14 and processor 12 to determine at least one value based on a bandwidth indication corresponding to a power containment ratio. According to certain example embodiments, the determination may be performed by using a transmitter filter with a frequency domain spectrum shaping waveform. Apparatus 10 may also be controlled by memory 14 and processor 12 to signal the at least one value to a network element.

As illustrated in the example of FIG. 15, apparatus 20 may be a network, core network element, or element in a communications network or associated with such a network, such as a gNB, BS, cell, or NW. It should be noted that one of ordinary skill in the art would understand that apparatus 20 may include components or features not shown in FIG. 15.

As illustrated in the example of FIG. 15, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 15, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-11 and 14.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-11 and 14.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to indicate to a user equipment implicitly or explicitly a first size of a first part of a frequency band segment within a total bandwidth allocation, and a second size of a second part of the frequency band segment. Apparatus 20 may also be controlled by memory 24 and processor 22 to determine at least one threshold value for a power spectral density or a power difference between the first part of the frequency band segment and the second part of the frequency band segment. Apparatus 20 may further be controlled by memory 24 and processor 22 to signal, to the user equipment, a configuration for the at least one threshold value to use in an indication of a frequency domain spectrum shaping filter power distribution. In addition, apparatus 20 may be controlled by memory 24 and processor 22 to receive, from the user equipment, a power indication for the frequency domain spectrum shaping filter power distribution.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for determining a first size of a first part of a frequency band segment within a total bandwidth allocation, and a second size of a second part of the frequency band segment. The apparatus may also include means for determining a value indicative of a power spectral density difference or power difference between the first part and the second part. The apparatus may further include means for generating a power indication of the frequency band segment within the total bandwidth allocation based on the power spectral density difference. In addition, the apparatus may include means for signaling, to a network element, the power indication for the frequency band segment within the total bandwidth allocation.

Other example embodiments may be directed to an apparatus that includes means for determining at least one value based on a bandwidth indication corresponding to a power containment ratio. According to certain example embodiments, the determination may be performed by using a transmitter filter with a frequency domain spectrum shaping waveform. The apparatus may also include means for signaling the at least one value to a network element.

Further example embodiments may be directed to an apparatus that includes means for indicating to a user equipment implicitly or explicitly a first size of a first part of a frequency band segment within a total bandwidth allocation, and a second size of a second part of the frequency band segment. The apparatus may also include means for determining at least one threshold value for a power spectral density or a power difference between the first part of the frequency band segment and the second part of the frequency band segment. The apparatus may further include means for signaling, to the user equipment, a configuration for the at least one threshold value to use in an indication of a frequency domain spectrum shaping filter power distribution. In addition, the apparatus may include means for receiving, from the user equipment, a power indication for the frequency domain spectrum shaping filter power distribution.

Certain example embodiments described herein provide several technical improvements, enhancements, and/or advantages. For instance, in some example embodiments, it may be possible to assist the gNB in selecting the preferred receiver strategy and/or the preferred scheduler strategy. It may also be possible to provide necessary information to the gNB to optimize usage of FDSS SE, and maximizing the link budget. In other example embodiments, it may be possible to provide the required additional information to correct the power control formula and, thus, avoid improper gNB expectations that no additional power or no sufficient power is available at the UE due to the current uniform power distribution assumption. This avoids limiting the configured BW allocation (i.e., data rate) or coverage due to a potential stop of power increment with transmit power control (TPC) before reaching real UE maximum power.

In further example embodiments, it may be possible to maximize the coverage or data rate for FDSS-based waveforms. This may be achieved by, for example, appropriately adjusting the power control and BW allocation according to the real available transmit power considering the non-uniform power over REs with FDSS with or without SE. It may also be possible to determine the useful segment of the excess-band with FDSS-SE if any to use in the gNB receiver partly/completely for the best performance-complexity tradeoff. According to other example embodiments, it may be possible to keep the current PHR definitions unchanged for backward compatibility and transmit additional complementary information to allow the gNB to optimize its decisions with FDSS. Additionally, the UE may keep its FDSS implementation as confidential.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
|---|---|
| 3GPP | 3rd Generation Partnership Project |
| 5G | 5th Generation |
| 5GCN | 5G Core Network |
| 5GS | 5G System |
| BD | Blind Detection |
| BPSK | Binary Phase Shift Keying |
| BW | Bandwidth |
| CE | Control Element |
| CP-OFDM | Cyclic Prefix OFDM |
| DCI | Downlink Control Information |
| DCI Format 0_1 | UL Grant Configurable by RRC |
| DFT-s-OFDM | Discrete Fourier Transform Spread Orthogonal Frequency Division Multiplexing |
| DMRS | Demodulation Reference Signal |
| eNB | Enhanced Node B |
| E-UTRAN | Evolved UTRAN |
| FDSS | Frequency Domain Spectrum Shaping |
| FR1 | Frequency Range 1 |
| gNB | 5G or Next Generation NodeB |
| LTE | Long Term Evolution |
| MAC | Medium Access Control |
| MCS | Modulation and Coding Scheme |
| MPR | Maximum Power Reduction |
| NB | Narrowband |
| NR | New Radio |
| NW | Network |
| OFDM | Orthogonal Frequency Division Multiplexing |
| PDU | Protocol Data Unit |
| PRB | Physical Resource Block |
| PHR | Power Headroom Report |
| PUSCH | Physical Uplink Shared Channel |
| QPSK | Quadrature Phase Shift Keying |
| RB, PRB | Resource Block, Physical RB |
| RE | Resource Element |
| RRC | Radio Resource Control |
| Rx | Receiver |
| SCS | Sub-carrier Spacing |
| S/P | Serial-to-Parallel |
| SR | Scheduling Request |
| TPC | Transmit Power Control |
| TS | Technical Specification |
| Tx | Transmit |
| UE | User Equipment |
| UL | Uplink |
| WI | Work Item |
| w/wo SE | With/Without Spectrum Extension |

We claim:

1. A method, comprising:
    determining a first size of a first part of a frequency band segment within a total bandwidth allocation, and a second size of a second part of the frequency band segment;
    determining a value indicative of a power spectral density difference or power difference between the first part and the second part;
    generating a power indication of the frequency band segment within the total bandwidth allocation based on the power spectral density difference or the power difference; and
    signaling, to a network element, a power headroom report comprising the power indication for the frequency band segment within the total bandwidth allocation.

2. The method according to claim 1, wherein the first part of the frequency band segment and the second part of the frequency band segment are at least one of the following:
    non-overlapping, or
    partially overlapping.

3. The method according to claim 1, wherein the frequency band segment is at least one of the following:
    a total allocation comprising in-band, excess-band, or any band segment within the total allocation, or
    a band segment or a fraction of the total allocation.

4. The method according to claim 1, wherein the frequency band segment is configurable within the total bandwidth allocation.

5. The method according to claim 1, wherein the power indication is signaled relative to a main frequency band segment or relative to an adjacent frequency band segment.

6. The method according to claim 1,
wherein the power indication is signaled by at least one bit, and
wherein the power indication comprises a power indication relative to a user equipment max transmission power.

7. An apparatus, comprising:
at least one processor; and
at least one memory comprising computer program code,
the at least one memory and the computer program code configured to, with storing instructions that, when executed by the at least one processor, cause the apparatus at least to:
determine a first size of a first part of a frequency band segment within a total bandwidth allocation, and a second size of a second part of the frequency band segment;
determine a value indicative of a power spectral density difference or power difference between the first part and the second part;
generate a power indication of the frequency band segment within the total bandwidth allocation based on the power spectral density difference or the power difference; and
signal, to a network element, a power headroom report comprising the power indication for the frequency band segment within the total bandwidth allocation.

8. The apparatus according to claim 7, wherein the first part of the frequency band segment and the second part of the frequency band segment are at least one of the following:
non-overlapping, or
partially overlapping.

9. The apparatus according to claim 7, wherein the frequency band segment is at least one of the following:
a total allocation comprising in-band, excess-band, or any band segment within the total allocation, or
a band segment or a fraction of the total allocation.

10. The apparatus according to claim 7, wherein the frequency band segment is configurable within the total bandwidth allocation.

11. The apparatus according to claim 7, wherein the power indication is signaled relative to a main frequency band segment or relative to an adjacent frequency band segment.

12. The apparatus according to claim 7,
wherein the power indication is signaled by at least one bit, and
wherein the power indication comprises a power indication relative to a user equipment max transmission power.

13. An apparatus, comprising:
at least one processor; and
at least one memory comprising computer program code,
the at least one memory and the computer program code configured to, with storing instructions that, when executed by the at least one processor, cause the apparatus at least to:
determine a first size of a first part of a frequency band segment within a total bandwidth allocation, and a second size of a second part of the frequency band segment; and
receive, from a user equipment, a power headroom report comprising a power indication for the frequency band segment within the total bandwidth allocation,
wherein the power indication is based on a value indicative of a power spectral density difference or a power difference between the first part and the second part.

14. The apparatus according to claim 13, wherein the first part of the frequency band segment and the second part of the frequency band segment are at least one of the following:
non-overlapping, or
partially overlapping.

15. The apparatus according to claim 13, wherein the frequency band segment is at least one of the following:
a total allocation comprising in-band, excess-band, or any band segment within the total allocation, or
a band segment or a fraction of the total allocation.

16. The apparatus according to claim 13, wherein the frequency band segment is configurable within the total bandwidth allocation.

17. The apparatus according to claim 13, wherein the power indication is received relative to a main frequency band segment or relative to an adjacent frequency band segment.

18. The apparatus according to claim 13,
wherein the power indication is received by at least one bit, and
wherein the power indication comprises a power indication relative to a user equipment max transmission power.

* * * * *